US011210497B2

(12) United States Patent
Osuga et al.

(10) Patent No.: US 11,210,497 B2
(45) Date of Patent: Dec. 28, 2021

(54) OCCUPANT MODELING DEVICE, OCCUPANT MODELING METHOD, AND OCCUPANT MODELING PROGRAM

(71) Applicant: AISIN SEIKI KABUSHIKI KAISHA, Kariya (JP)

(72) Inventors: Shin Osuga, Kariya (JP); Takashi Kato, Kariya (JP); Yoshiyuki Yamada, Kariya (JP); Tetsuya Hattori, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 165 days.

(21) Appl. No.: 16/578,686

(22) Filed: Sep. 23, 2019

(65) Prior Publication Data

US 2020/0104571 A1 Apr. 2, 2020

(30) Foreign Application Priority Data

Sep. 27, 2018 (JP) .............................. JP2018-182750

(51) Int. Cl.
*G06K 9/00* (2006.01)
*G06T 7/70* (2017.01)
(Continued)

(52) U.S. Cl.
CPC .... *G06K 9/00268* (2013.01); *B60R 21/01538* (2014.10); *B60W 40/08* (2013.01);
(Continued)

(58) Field of Classification Search
CPC ........... G06K 9/00268; G06K 9/00845; G06K 9/00261; G06T 7/70; G06T 2207/30201;
(Continued)

(56) References Cited

U.S. PATENT DOCUMENTS 8,351,658 B2 1/2013 Adachi et al.
2015/0098634 A1* 4/2015 Ohsuga .............. G06K 9/00261
382/118

(Continued)

FOREIGN PATENT DOCUMENTS

JP 2715511 B2 2/1998
JP 4895847 B2 3/2012

OTHER PUBLICATIONS

P. Tresadern et al., "Handbook of Face Recognition 2nd Edition", Face Alignment Models, 2011, pp. 124-133.

*Primary Examiner* — Dhaval V Patel
(74) *Attorney, Agent, or Firm* — Sughrue Mion, PLLC

(57) ABSTRACT

An occupant modeling device includes: an acquisition section acquiring an image by imaging a region where there is a probability that a face of an occupant is present; a model fitting section generating a model of the face based on a first image acquired by the acquisition section; a tracking section adapting the model to a second image acquired after the first image; a determination section determining correctness of a facial part position included in the second image to which the model is adapted, by using learned information obtained through learning based on correct information and incorrect information regarding the facial part position; and a processing section determining whether a process in the tracking section is to be continuously executed or a process in the model fitting section is to be executed again according to a determination result in the determination section.

4 Claims, 10 Drawing Sheets

(51) Int. Cl.
*B60W 40/08* (2012.01)
*B60R 21/015* (2006.01)

(52) U.S. Cl.
CPC ............ *G06K 9/00845* (2013.01); *G06T 7/70* (2017.01); *B60R 21/01552* (2014.10); *B60W 2040/0818* (2013.01); *G06T 2207/30201* (2013.01)

(58) Field of Classification Search
CPC . G06T 2207/20121; G06T 2207/20124; G06T 2207/10048; G06T 7/251; G06T 2207/10016; G06T 2207/30268; B60W 40/08; B60W 2040/0818; B60W 2420/42; B60W 2040/0872; B60R 21/01538; B60R 21/01552
See application file for complete search history.

(56) References Cited

U.S. PATENT DOCUMENTS

| | | | | |
|---|---|---|---|---|
| 2016/0253550 | A1* | 9/2016 | Zhang | G06K 9/4604 |
| | | | | 382/203 |
| 2017/0154470 | A1* | 6/2017 | Zhang | G06K 9/00261 |
| 2019/0362144 | A1* | 11/2019 | Chen | A61B 3/14 |
| 2020/0065559 | A1* | 2/2020 | Vats | G06K 9/00228 |

* cited by examiner

OCCUPANT MODELING DEVICE, OCCUPANT MODELING METHOD, AND OCCUPANT MODELING PROGRAM

CROSS REFERENCE TO RELATED APPLICATIONS

This application is based on and claims priority under 35 U.S.C. § 119 to Japanese Patent Application 2018-182750, filed on Sep. 27, 2018, the entire contents of which are incorporated herein by reference.

TECHNICAL FIELD

An embodiment disclosed here relates to an occupant modeling device, an occupant modeling method, and an occupant modeling program.

BACKGROUND DISCUSSION

In the related art, development of a face detection technique of detecting a position and a direction of a face, and a state of a facial part such as the eyes or the mouth, included in a captured image (a still image or a moving image) has progressed. For example, in a vehicle, a technique has been proposed in which a face of a driver is detected such that inattentive driving or drowsy driving is sensed, and a predetermined action such as a warning is performed. Face detection is preferably executed in real time in order to perform such sensing, but, in the inside of a vehicle, an intensity of light coming from the outside of the vehicle or a direction in which light comes tends to change, and a face of a driver tends to be moved due to shaking of the vehicle or an action of checking the periphery. As the face detection technique, for example, Stan Z. Li, Anil K. Jain, "Handbook of Face Recognition 2nd Edition" discloses a face detection technique (active shape model: ASM or active appearance model: AAM) of generating a model of a face in an image by performing so-called model fitting of fitting a statistical face shape model with the face in the image by using a steepest descent method or the like. According to this technique, a model of a face in an image is generated, subsequent fitting with the face in the image, that is, tracking can be performed by using the model, and thus a position and a direction of the face, and each facial part can be temporally specified. Japanese Patent No. 4895847 discloses a facial part detection technique in which an image change region due to an eyeblink is detected by using a difference image between frames, and thus positions of the eyes are specified.

In a case where the model fitting is performed, in a case where an initial state (a position, a shape, or an angle) of the face shape model is greatly different from a state of a face in an actual image, falling into a local optimum solution may occur, and thus an accurate fitting process may not be performed. Thus, in a case where a tracking process using a model generated through the fitting process is successively performed, an error may be accommodated, and thus face detection accuracy may deteriorate. Thus, a technique may be considered in which a process of checking whether or not an accurate model is used in a tracking process is performed through combination with another system, for example, the facial part detection technique based on eyeblinks in Japanese Patent No. 4895847, and thus deterioration in the accuracy is alleviated. However, there is an individual difference in an interval of eyeblinks, and some people may not blink for a long period of time (for example, about one minute or longer). In this case, a check process is not performed before an eyeblink is detected. As a result, a period in which an appropriate tracking process is not performed is increased, and thus there is a problem of not being capable of taking a sufficient countermeasure for deterioration in face detection accuracy. Therefore, providing an occupant modeling device, an occupant modeling method, and an occupant modeling program capable of easily maintaining a tracking process can significantly improve performance of maintaining face detection accuracy.

SUMMARY

An occupant modeling device according to an aspect of this disclosure includes, for example, an acquisition section that acquires an image obtained by imaging a region in which there is a probability that a face of an occupant is present in a vehicle; a model fitting section that generates a model of the face based on a first image acquired by the acquisition section; a tracking section that adapts the model to a second image acquired after the first image acquired by the acquisition section; a determination section that determines correctness of a facial part position included in the second image to which the model is adapted, by using learned information obtained through learning based on correct information and incorrect information regarding the facial part position of the face; and a processing section that determines whether a process in the tracking section is to be continuously executed or a process in the model fitting section is to be executed again according to a determination result in the determination section. According to this configuration, for example, in a case where the second image of a face of an occupant can be acquired, correctness of a facial part position can be determined based on learned information, and it can be determined whether a process in the tracking section is to be continuously executed or a process in the model fitting section is to be executed again according to a determination result. As a result, it is possible to prevent a tracking process in which face sensing accuracy deteriorates from being continuously executed.

An occupant modeling method according to another aspect of this disclosure includes, for example, an acquisition step of acquiring an image obtained by imaging a region in which there is a probability that a face of an occupant is present in a vehicle; a model fitting step of generating a model of the face based on a first image acquired in the acquisition step; a tracking step of adapting the model to a second image acquired after the first image acquired in the acquisition step; a determination step of determining correctness of a facial part position included in the second image to which the model is adapted, by using learned information obtained through learning based on correct information and incorrect information regarding the facial part position of the face; and a processing step of determining whether a process in the tracking step is to be continuously executed or a process in the model fitting step is to be executed again according to a determination result in the determination step. According to this configuration, for example, in a case where the second image of a face of an occupant can be acquired, correctness of a facial part position can be determined based on learned information, and it can be determined whether a process in the tracking step is to be continuously executed or a process in the model fitting step is to be executed again according to a determination result. As a result, it is possible to prevent a process in a tracking step in which face sensing accuracy deteriorates from being continuously executed.

An occupant modeling program according to another aspect of this disclosure causes, for example, a computer to execute an acquisition step of acquiring an image obtained by imaging a region in which there is a probability that a face of an occupant is present in a vehicle; a model fitting step of generating a model of the face based on a first image acquired in the acquisition step; a tracking step of adapting the model to a second image acquired after the first image acquired in the acquisition step; a determination step of determining correctness of a facial part position included in the second image to which the model is adapted, by using learned information obtained through learning based on correct information and incorrect information regarding the facial part position of the face; and a processing step of determining whether a process in the tracking step is to be continuously executed or a process in the model fitting step is to be executed again according to a determination result in the determination step. According to this configuration, for example, in a case where the second image of a face of an occupant can be acquired, the computer can be caused to determine correctness of a facial part position based on learned information, and to determine whether a process in the tracking step is to be continuously executed or a process in the model fitting step is to be executed again according to a determination result. As a result, it is possible to prevent a tracking process in which face sensing accuracy deteriorates from being continuously executed.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary perspective view illustrating a state in which a part of a vehicle cabin of a vehicle mounted with an occupant modeling device according to an embodiment is seen through;

DETAILED DESCRIPTION

Hereinafter, an exemplary embodiment disclosed here will be described. Configurations of an embodiment described below and operations, results, and effects caused by the configurations are only examples. This disclosure can be realized by configurations other than the configurations disclosed in the following embodiment, and can achieve at least one of various effects based on the fundamental configurations or derivative effects.

In the following embodiment, a vehicle 1 may be an automobile (internal combustion automobile) having, for example, an internal combustion engine (engine) (not illustrated) as a drive source, may be an automobile (an electric automobile or a fuel cell automobile) having an electric motor (motor) (not illustrated) as a drive source, and may be an automobile (hybrid automobile) having both thereof as drive sources. The vehicle 1 may be mounted with various gear shift devices, and may be mounted with various devices (systems and components) required to drive an internal combustion engine or an electric motor. Types, the number, layouts, and the like of devices related to drive of vehicle wheels 3 of the vehicle 1 may be variously set.

Figure 1:
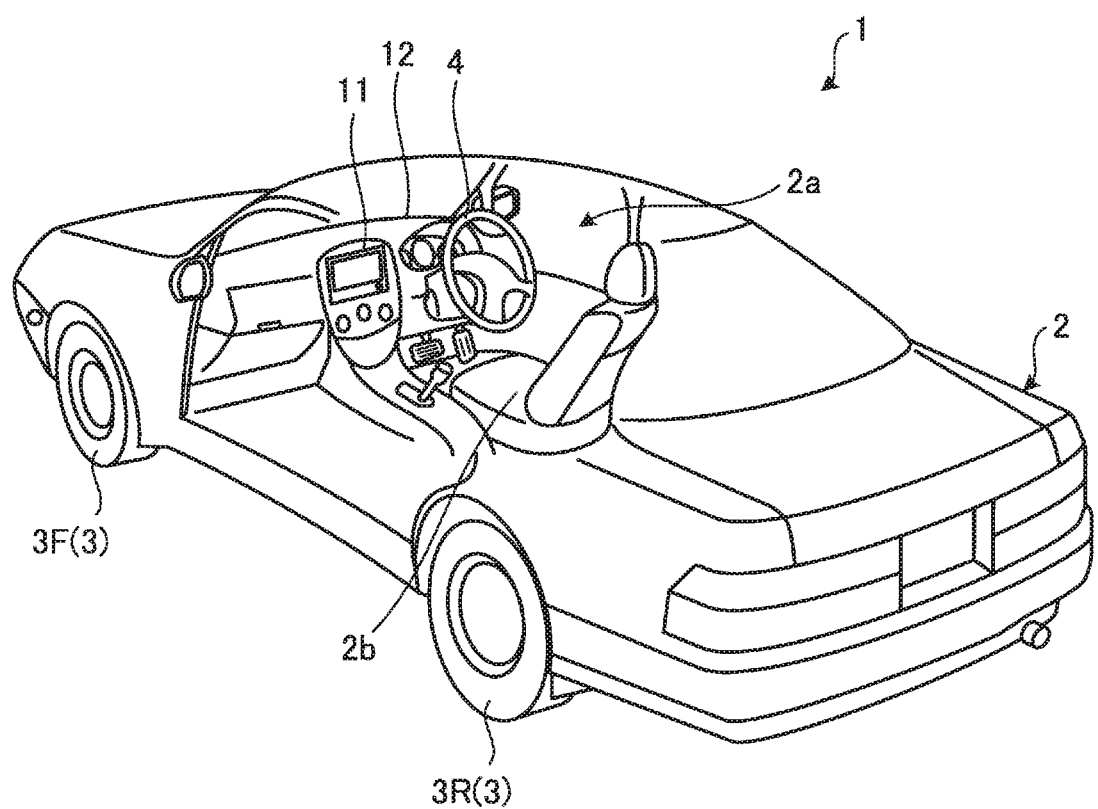

As illustrated in FIG. 1, a vehicle body 2 of the vehicle 1 forms a vehicle cabin 2a in which a driver (not illustrated) rides. A steering unit 4 and the like are provided in a state of facing a seat 2b of the driver as an occupant in the vehicle cabin 2a. In the present embodiment, as an example, the steering unit 4 is a steering wheel protruding from a dashboard 12 (instrument panel).

As illustrated in FIG. 1, in the present embodiment, as an example, the vehicle 1 is a four-wheeled vehicle (four-wheeled automobile) and has two left and right front wheels 3F and two left and right rear wheels 3R. In the present embodiment, the four vehicle wheels 3 are configured to be steered (turned).

A monitor apparatus 11 is provided, for example, at a central portion of the dashboard 12 in a vehicle width direction (leftward-rightward direction) in the vehicle cabin 2a. The monitor apparatus 11 is provided with a display device and a sound output device. The display device is, for example, a liquid crystal display (LCD) or an organic electroluminescent display (OLED). The sound output device is, for example, a speaker. The display device is covered with a transparent operation input unit 10 (refer to FIG. 3) such as a touch panel. An occupant can visually recognize an image displayed on a display screen of a display device 8 via the operation input unit 10. The occupant performs an operation by touching or pressing the operation input unit 10 with the finger, or moving the finger at a position corresponding to an image displayed on the display screen of the display device 8 (refer to FIG. 3), and can thus execute operation input. The monitor apparatus 11 may also be used as, for example, a navigation system or an audio system.

Figure 2:
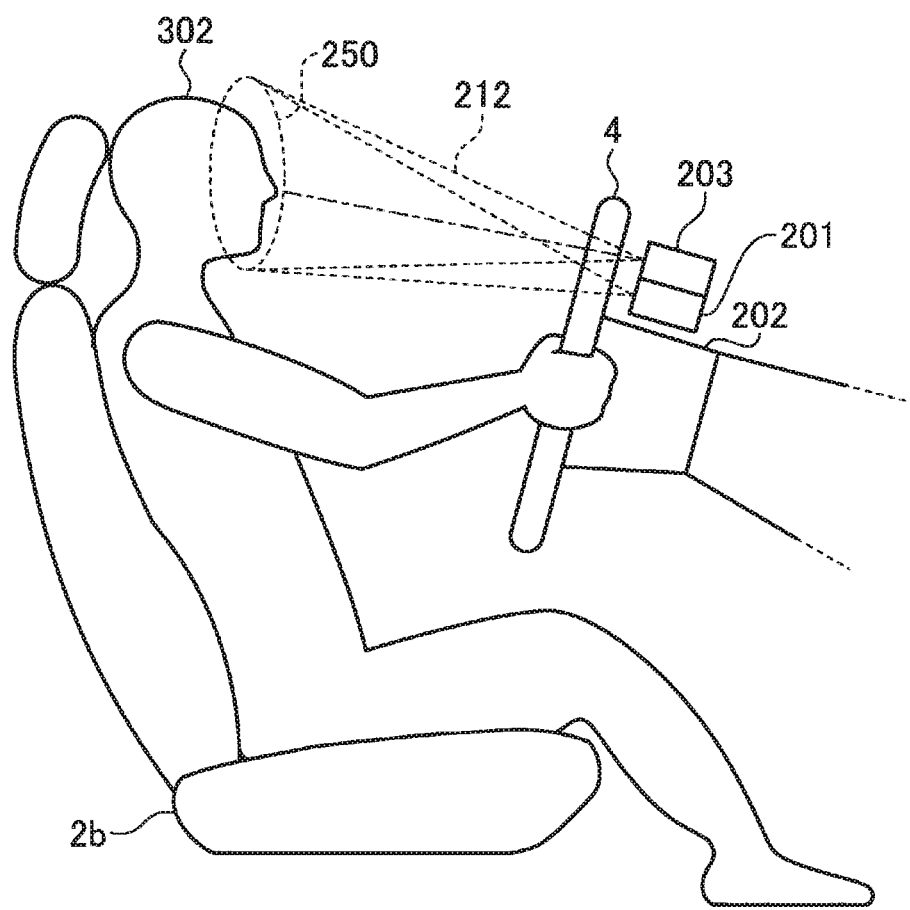
FIG. 2 is a schematic diagram illustrating an example of disposition of an imaging unit and an infrared irradiator capturing an image used in the occupant modeling device according to the embodiment.

As illustrated in FIG. 2, an imaging unit 201 and an infrared irradiator 203 are provided on a handle column 202 supporting the steering unit 4. The infrared irradiator 203 may be configured with, for example, a light emitting diode (LED) light applying an infrared ray. The imaging unit 201 may be configured with, for example, a charge coupled device (CCD) camera corresponding to imaging using an infrared ray.

A viewing angle and a pose of the imaging unit 201 are adjusted such that a face of a driver 302 sitting on the seat 2b is located at the center of a visual field. The imaging unit 201 may output moving image data (captured image data) at a predetermined frame rate. The infrared irradiator 203 is adjusted such that an optical path of light applied from the infrared irradiator 203 comes near the face of the driver 302 sitting on the driver's seat 2b.

As a result of the adjustment, the infrared irradiator 203 irradiates, with an infrared ray 212, a region 250 in which the face of the driver 302 may be present in a case where the driver 302 (person) sits on the seat 2b. Since the infrared ray 212 is not recognized as light to the human eyes, even though the infrared ray 212 is applied toward the face of the driver 302, and thus the driver 302 irradiated with the infrared ray 212 does not feel glaring. Therefore, it is possible to ensure comfortability while the driver 302 is performing driving, and also to easily image the face of the driver 302 in the imaging unit 201.

As a result of the adjustment, the imaging unit 201 images the region 250 which is irradiated with the infrared ray 212 by the infrared irradiator 203 and in which the face of the driver 302 may be present. For example, the imaging unit 201 continuously images the face of the driver 302 during driving of the vehicle 1, and sequentially outputs captured image data obtained through imaging, to an electronic control unit (ECU: refer to FIG. 3) 14. The imaging in the imaging unit 201 may be normally performed, and may be periodically performed at a predetermined period interval. In a case where an infrared camera is used as the imaging unit 201, the infrared camera is hardly influenced by ambient light, and can favorably image a region in which the face of the driver 302 may be present. In other embodiments, a visible light camera may be used as the imaging unit 201. In this case, the infrared irradiator 203 may be omitted, and thus a system can be simplified. A position where the imaging unit 201 and the infrared irradiator 203 are provided is not limited to the handle column 202, and may be changed as appropriate to a location where the region 250 in which the face of the driver 302 may be present can be imaged. For example, the imaging unit 201 and the infrared irradiator 203 may be provided on the dashboard 12, and may be provided on a ceiling or at a rearview mirror. The imaging unit 201 and the infrared irradiator 203 may be respectively provided at separated positions.

Figure 3:
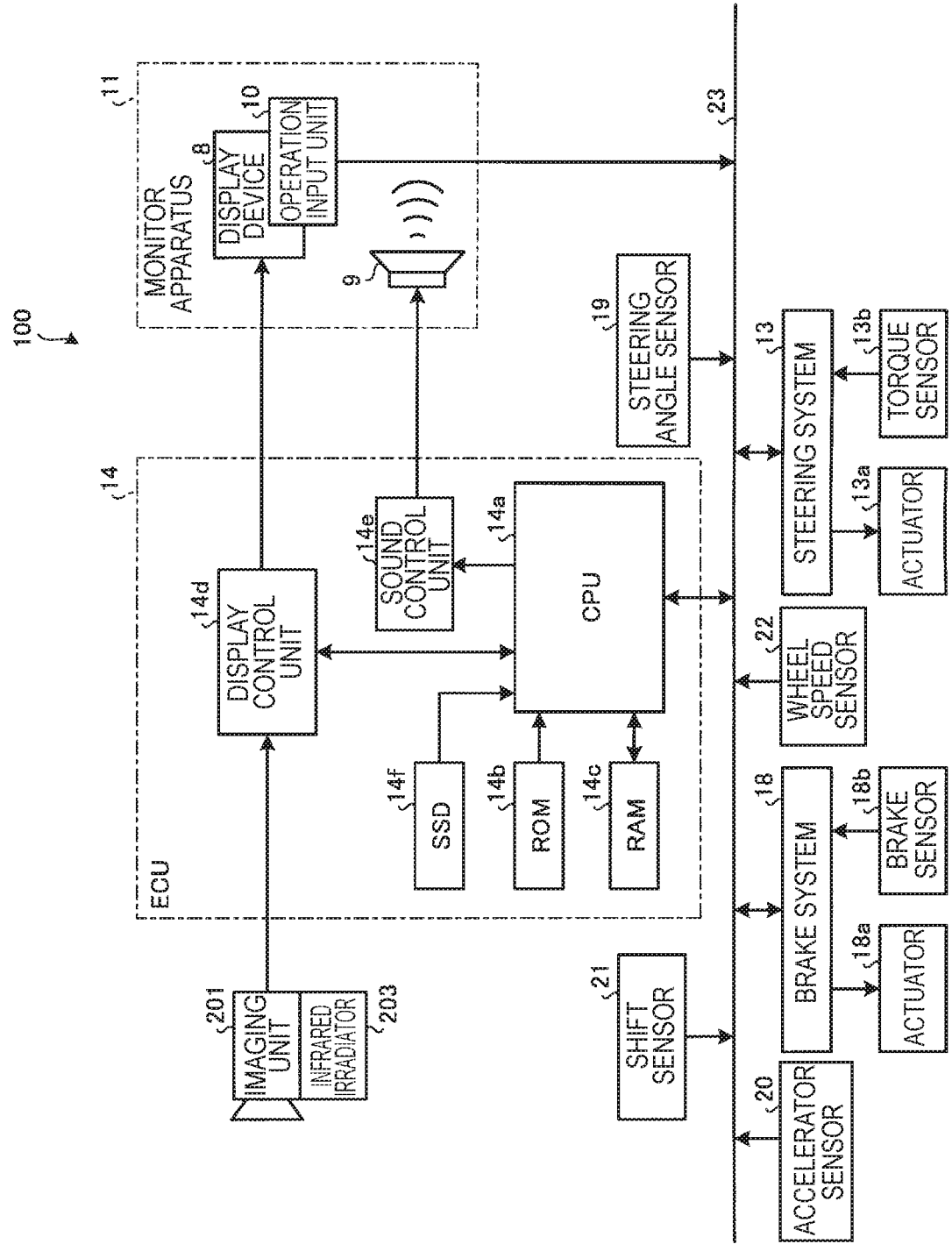
FIG. 3 is an exemplary block diagram illustrating a configuration of a vehicle control system including an ECU realizing the occupant modeling device (occupant modeling unit) according to the embodiment.

FIG. 3 is an exemplary block diagram illustrating a configuration of a vehicle control system 100 including the ECU 14 realizing the occupant modeling device (occupant modeling unit) according to the embodiment. As exemplified in FIG. 3, in the vehicle control system 100, in addition to the ECU 14, the monitor apparatus 11, and a steering system 13, a brake system 18, a steering angle sensor 19, an accelerator sensor 20, a shift sensor 21, and a vehicle wheel sensor 22 are electrically connected to each other via an on-vehicle network 23 as an electric communication channel. The on-vehicle network 23 is configured with, for example, a controller area network (CAN). The ECU 14 sends control signals via the on-vehicle network 23, and can thus control the steering system 13 including an actuator 13a, the brake system 18 including an actuator 18a, and the like. The ECU 14 may receive detection results in a torque sensor 13b, a brake sensor 18b, the steering angle sensor 19, the accelerator sensor 20, the shift sensor 21, and the vehicle wheel sensor 22, or an operation signal from the operation input unit 10, via the on-vehicle network 23. In the present embodiment, the ECU 14 may be an example of an occupant modeling device.

The ECU 14 includes, for example, a central processing unit (CPU) 14a, a read only memory (ROM) 14b, a random access memory (RAM) 14c, a display control unit 14d, a sound control unit 14e, and a solid state drive (SSD) 14f. The CPU 14a realizes an occupant modeling device (occupant modeling unit), and controls the entire vehicle 1. The CPU 14a reads a program installed and stored in a nonvolatile storage device such as the ROM 14b, and executes a calculation process according to the program. The RAM 14c temporarily stores various pieces of data used for calculation in the CPU 14a. The display control unit 14d provides captured image data acquired from the imaging unit 201 to the CPU 14a, and processes image data to be displayed on the display device 8. The sound control unit 14e generally executes a process on sound data output from the sound output unit 9 among calculation processes in the ECU 14. The SSD 14f is a rewritable nonvolatile storage unit, and stores data even in a case where the ECU 14 is powered off. The CPU 14a, the ROM 14b, and the RAM 14c may be integrated into an identical package. The ECU 14 may use other logic calculation processors such as a digital signal processor (DSP) or a logic circuit instead of the CPU 14a. A hard disk drive (HDD) may be provided instead of the SSD 14f, and the SSD 14f or the HDD may be provided separately from the ECU 14.

Configurations, dispositions, and electrical connection forms of the various sensors or actuators are only examples, and may be variously set (changed).

In the present embodiment, the ECU 14 executes a process of sequentially extracting the face of the driver 302 from captured image data obtained by the imaging unit 201 through cooperation between hardware and software (control program). The ECU 14 realizes a check process of sequentially checking whether or not the face of the driver 302 is correctly extracted.

Figure 4:
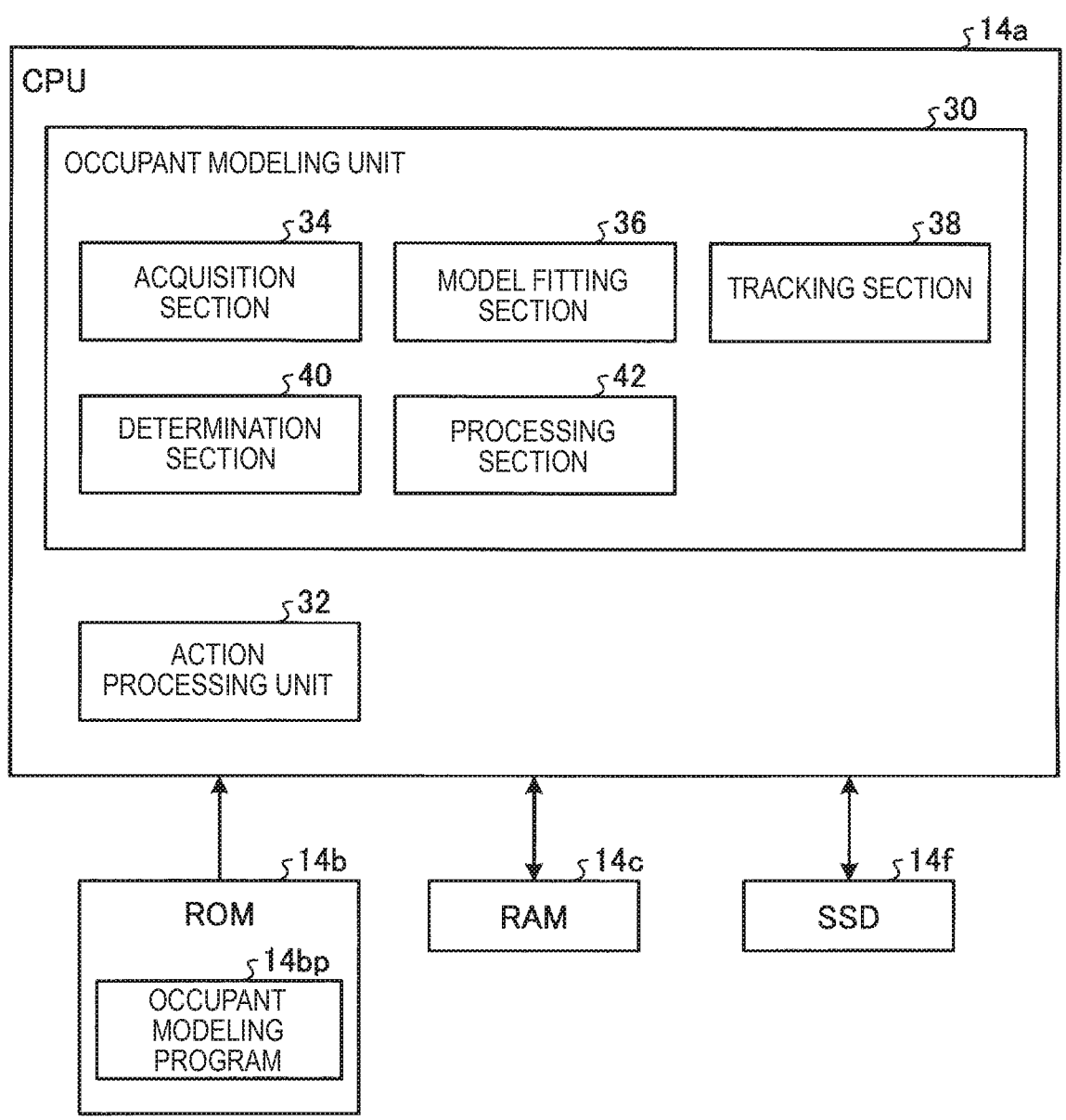
FIG. 4 is an exemplary block diagram illustrating that each module of the occupant modeling device (occupant monitoring unit) according to the embodiment is realized by a CPU.

FIG. 4 is an exemplary functional block diagram illustrating an occupant modeling unit 30 (occupant modeling device) realized by the CPU 14a included in the ECU 14. The CPU 14a included in the ECU 14 realizes various modules for executing the process of sequentially extracting the face of the driver 302, the process of sequentially checking whether or not the face of the driver 302 is correctly extracted, and a determination process of determining a subsequent process corresponding to a check result. The CPU 14a realizes a module for executing a predetermined action such as execution of various warning processes or execution of control of the vehicle 1 regardless of an operation of the driver 302, according to a state (a direction or an expression) of the extracted face of the driver 302. The various modules are realized by the CPU 14a reading and executing an occupant modeling program 14 bp installed and stored in a storage device such as the ROM 14b. As illustrated in FIG. 4, for example, the CPU 14a realizes the occupant modeling unit 30 and an action processing unit 32. The CPU 14a may realize various other processing devices (processing units). The occupant modeling unit 30 and the action processing unit 32 may be realized by a CPU that is different from the CPU 14a, and may be realized in another ECU. The occupant modeling unit 30 and the action processing unit 32 may be configured with dedicated hardware.

The occupant modeling unit 30 includes, as described above, an acquisition section 34, a model fitting section 36, a tracking section 38, a determination section 40, and a processing section 42 as modules executing the process of sequentially extracting the face of the driver 302 and the check process of sequentially checking whether or not the face of the driver 302 is correctly extracted.

The acquisition section 34 sequentially acquires captured image data obtained by the imaging unit 201, and stores the captured image data into a storage unit such as the RAM 14c in the frame unit. Therefore, the RAM 14c is used as a work area when the CPU 14a executes a program, and may also be used as a frame memory temporarily storing the captured image data in the frame unit. The RAM 14c may also be used to temporarily store a model (3D model) obtained as a result of a model fitting process which will be described later or a template based on the model. The acquisition section 34 may acquire captured image data that is sequentially obtained by the imaging unit 201, and may acquire captured image data as a result of the acquisition section 34 causing the imaging unit 201 to execute an imaging process at a predetermined timing.

In a case where captured image data (an image at the time of starting model fitting will be referred to as a "first image" in some cases) obtained by the imaging unit 201 is acquired by the acquisition section 34, the model fitting section 36 executes a model fitting process so as to generate a model (a 3D model or a face model) corresponding to the face of the driver 302.

Figure 5:
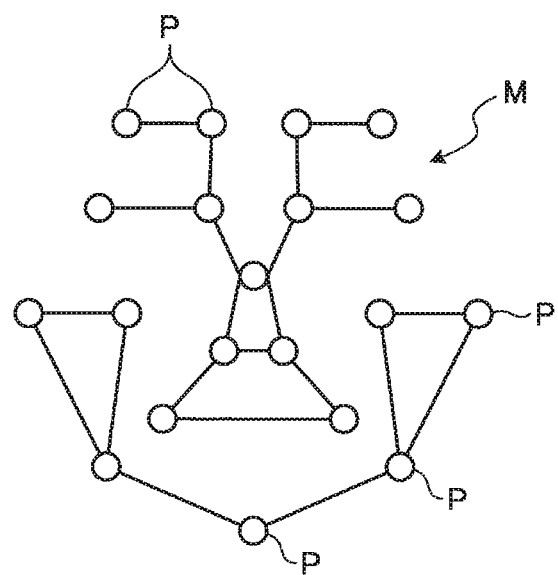
FIG. 5 is an exemplary schematic diagram for describing a model of a face used in the occupant modeling device according to the embodiment.
Figure 6:
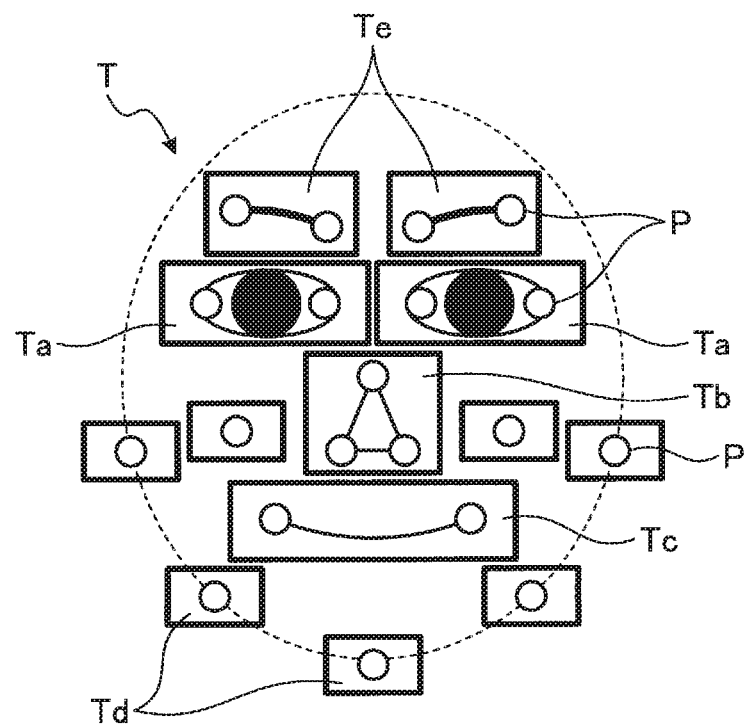
FIG. 6 is an exemplary schematic diagram for describing a template corresponding to the model of the face in FIG. 5.

FIG. 5 is a diagram schematically illustrating an example of a model M of the face used in the present embodiment. The model M includes a plurality of feature points P each representing a predetermined facial part. The feature point P is represented by a coordinate with any point as the origin. FIG. 5 illustrates the feature points P representing the eyes, the nose, the mouse, the eyebrows, and a contour, but the model M may include feature points P representing facial parts that are different from those represented by the feature points P illustrated in FIG. 5. According to the present embodiment, in the model fitting process, a statistical face shape model, that is, a temporary model of an average face created in advance is used as an initial state, the feature points P of the temporary model are located at respective portions of a face in the first image acquired by the acquisition section 34 at the time of starting model fitting, and thus the model M approximate to the face in the first image can be generated. FIG. 6 is a diagram schematically illustrating an example of a template T used to retrieve the feature points P defining characteristic facial parts included in the face, for example, the eyes, the nose, the mouse, the eyebrows, and a contour. As illustrated in FIG. 6, the template T includes a region Ta including the feature points P representing the eyes, a region Tb including the feature points P representing the nose, a region Tc representing the mouth, a region Td including the feature points P representing the contour, and a region Te including the feature points P representing the eyebrows. Each region of the template T corresponds to one or two or more feature points P, and is correlated with coordinates of the feature points P. Positions and the number of the regions Ta to Te of the template T may be set to any positions and any number as long as tracking of the model M is possible.

The model fitting section 36 acquires an image (first image) of a frame at the time of starting a model fitting process (at the time of starting a face detection process) and a temporary model from the RAM 14c. The model fitting section 36 performs model fitting on the first image by using the temporary model, and thus the model M and the template T adapted to a face included in the first image are generated. The model M and the template T generated by the model fitting section 36 are temporarily preserved in the RAM 14c or the like so as to be used for a tracking process executed by the tracking section 38. As a method of the model fitting process, any model fitting method such as the well-known active appearance model (AAM) method or active shape model (ASM) method may be used.

Figure 7:
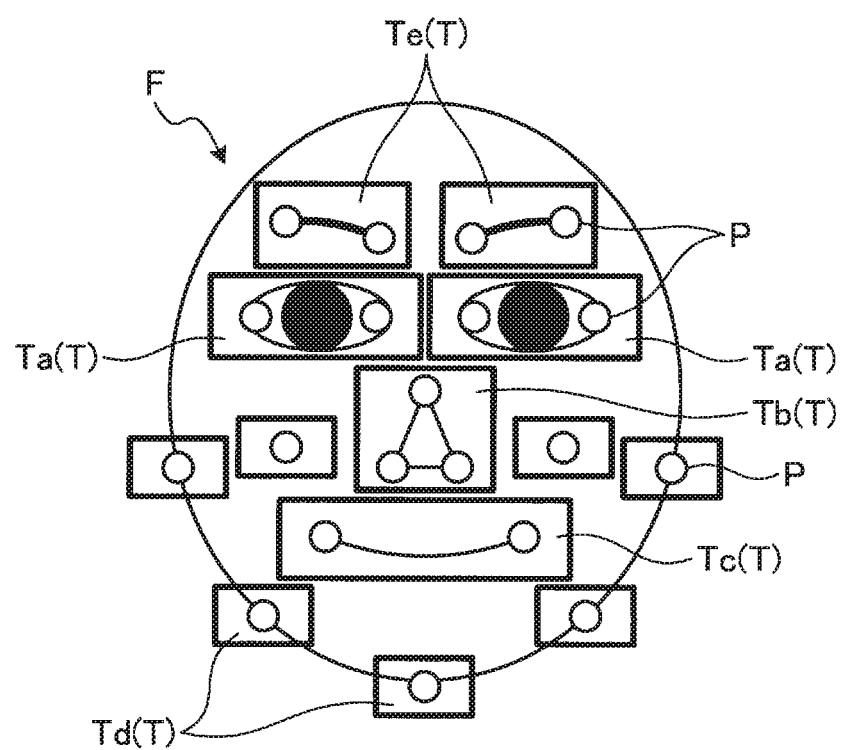
FIG. 7 is a schematic diagram for describing a scene of a tracking process in the occupant modeling device according to the embodiment.

After the model fitting section 36 generates the model M in the model fitting, the tracking section 38 adapts the model M to a face of which an angle, a position, or a size may change in a second image that is sequentially captured after the first image. In this case, feature points are extracted from the second image by using the template T, and thus tracking of the model M is performed. The tracking section 38 acquires a processing target frame image (second image), and the model M and the template T used in the previous process from the RAM 14c. In a case of a first tracking process, the map matching and the template T generated in the model fitting process are acquired. In a case of second and subsequent tracking processes consecutively performed, the model M and the template T updated in the previous tracking process are acquired. As illustrated in FIG. 7, a second image F is compared with the template T. Specifically, the tracking section 38 scans the respective regions Ta to Te of the template T on the second image F, and compares a region at each position with an image included in the region. The tracking section 38 determines a position of each region of the template T by using the most approximate position as a result of the comparison, and preserves the template T to which the position is applied into the RAM 14c. Thereafter, the tracking section 38 determines an angle, a position, and a size of the model M associated with the respective regions of the template T based on the model M read from the RAM 14c and the preserved new template T. In other words, the model M is rotated, enlarged, or reduced to be adapted to the second image, and thus the model M to which the angle, the position, and the size are applied is obtained. As a result, the model M is adapted (tracked) to the processing target frame image (second image). The tracking section 38 preserves the model M in the RAM 14c as the updated model M. As mentioned above, the tracking section 38 performs a tracking process by using the template T, and can thus perform tracking with a low processing load.

Figure 8:
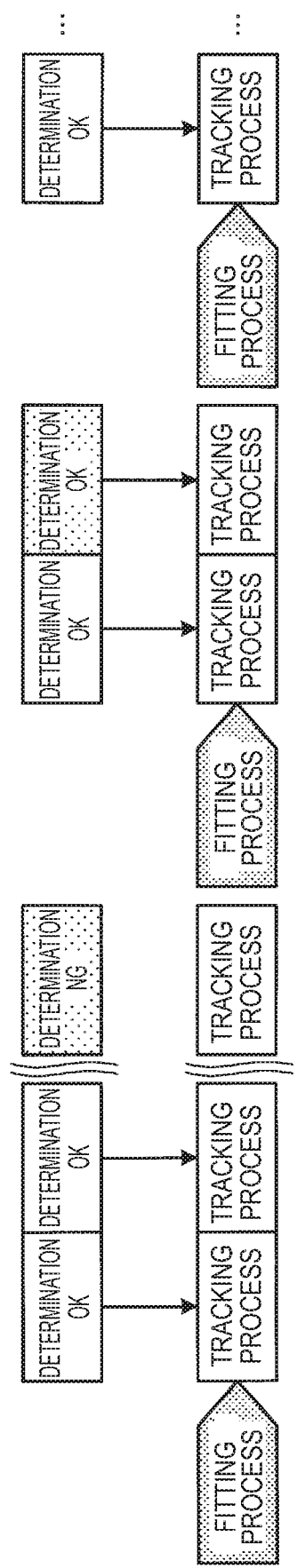
FIG. 8 is an exemplary schematic diagram illustrating that a tracking process and a determination process are executed in parallel in the occupant modeling device according to the embodiment.

However, as described above, in a case where a tracking target is a face, for example, a so-called tracking deviation in which positions of the rims of glasses or the eyebrows and positions of the eyes are wrongly recognized may be caused. In this case, in a case where a tracking process is consecutively executed on the next frame image in a state in which the tracking deviation (wrong recognition) is caused, the influence of the tracking deviation is accumulated, and thus there is concern that deterioration in the accuracy of the model M may increase. Therefore, as illustrated in FIG. 8, the occupant modeling unit 30 of the present embodiment causes the determination section 40 to execute a check process of sequentially checking whether or not a tracking process is correctly executed, that is, extraction of the face of the driver 302 is correctly performed in parallel to the tracking process.

Figure 9:
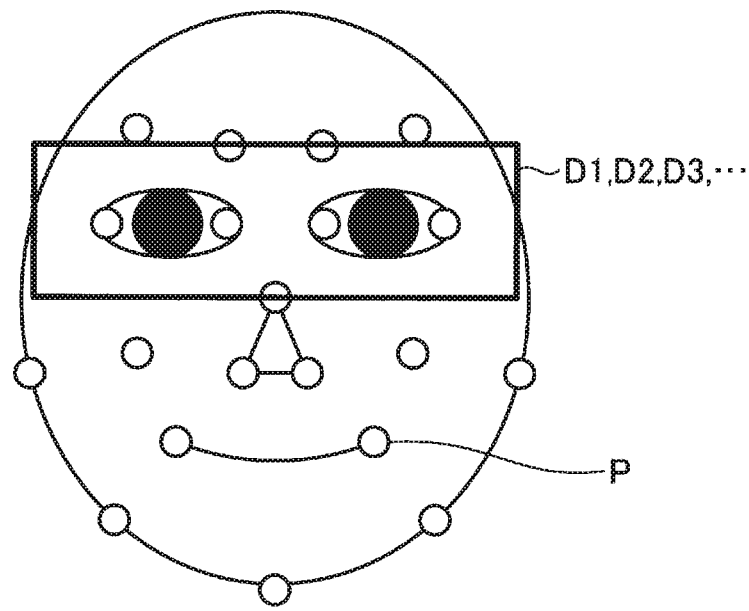
FIG. 9 is an exemplary schematic diagram illustrating a determination region in a case where a determination section of the occupant modeling device according to the embodiment executes a first determination of determining correctness of positions of the eyes of a face as facial part positions.

The determination section 40 determines correctness of a facial part position included in the second image to which the model M is adapted, by using learned information created through a machine learning method such as deep learning in which learning is performed based on correct information and incorrect information regarding facial part positions of a large amount of faces acquired in the past. As illustrated in FIG. 9, the learned information (learning image) is obtained through learning using a rectangular region D1 centering on the eyes as the correct information (positive data) and by using, as the incorrect information (negative information), cutout rectangular regions D2, D3, . . . obtained through position movement, enlargement, reduction, or rotation, or a combination thereof by a predetermined value or greater with respect to the correct information. The determination section 40 acquires positions (the feature points P used to extract an image seen as the eyes) recognized as, for example, the eyes in the second image to which the model M is adapted, in the tracking process. The determination section 40 acquires a cutout image obtained by cutting out the periphery of the eyes recognized in the tracking process by a predetermined area (region), from the same second information as the second image that is a processing target in the tracking process, based on the acquired feature points P. Regarding an area of the cutout image, for example, a distance or more defined by the corners of the left and right eyes may be a transverse width of the region, and, for example, ½ to ⅓ of the transverse width may be a longitudinal width. The determination section 40 determines the cutout image by using the learned information, and can thus determine correctness of the facial part positions recognized in the tracking process, for example, correctness of the positions of the eyes. For example, a case where positions of the eyes as facial part positions are being tracked in a state of being deviated by a predetermined amount or more (for example, in a case where the feature points P representing the eyes wrongly track the rims of glasses or the eyebrows) may be determined. In the present embodiment, as described above, a determination of correctness of facial part positions performed on positions of the eyes will be referred to as a "first determination" in some cases.

Figure 10:
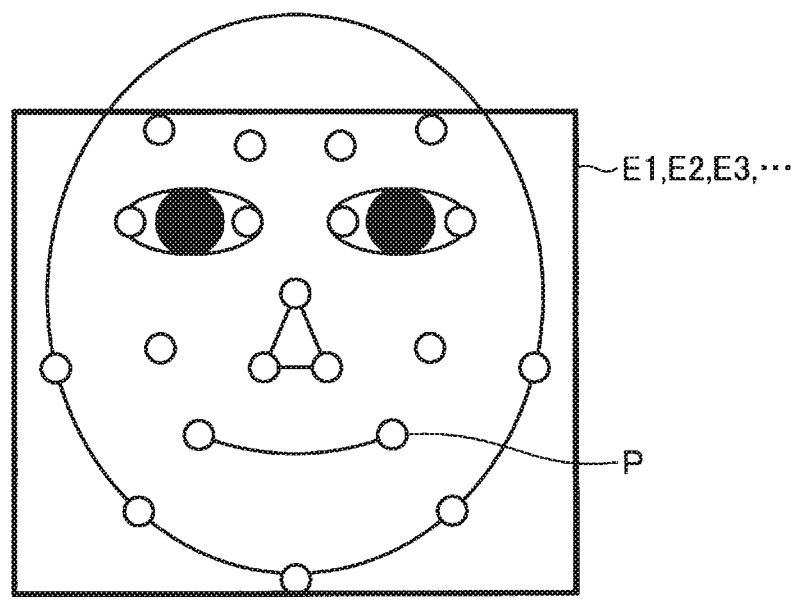
FIG. 10 is an exemplary schematic diagram illustrating a determination region in a case where the determination unit of the occupant modeling device according to the embodiment executes a second determination of determining correctness of positions of a plurality of facial parts included in the face as facial part positions.

In another determination in the determination section 40, correctness of a plurality of facial part positions included in a face may be determined. As illustrated in FIG. 10, learning is performed by using a rectangular region E1 including a plurality of facial parts included in a face, for example, the whole face such as the eyes, the nose, the mouth, the eyebrows, and a contour centering on the eyes as the correct information (positive data) and by using, as the incorrect information (negative information), cutout rectangular regions E2, E3, . . . obtained through position movement, enlargement, reduction, or rotation, or a combination thereof by a predetermined value or greater with respect to the correct information. The determination section 40 acquires positions (the feature points P used to extract an image seen as the facial parts) recognized as the face, for example, in the second image to which the model M is adapted, in the tracking process. The determination section 40 acquires a cutout image obtained by cutting out an image centering on the face recognized in the tracking process by a predetermined area (region), from the same second information as the second image that is a processing target in the tracking process, based on the acquired feature points P. The determination section 40 determines the cutout image by using the learned information, and can thus determine correctness of the facial part positions (a position of the face) recognized in the tracking process. In this case, it is possible to determine a state in which the position of the face is greatly deviated, for example, the occurrence of wrong tracking in which a position that is completely different from the face position is wrongly recognized as the face or the occurrence of wrong fitting in the model fitting section 36. In the present embodiment, as described above, a determination of correctness of facial part positions performed on positions of a plurality of facial parts (for example, the whole face) will be referred to as a "second determination" in some cases. In the second determination, as long as a plurality of types of facial parts are included in the rectangular region E1 or the like, the number of types may be changed as appropriate.

The determination section 40 executes at least one of the first determination and the second determination. For example, in a case where correctness of a facial part position is determined according to either one of the first determination and the second determination, an efficient determination process can be performed. Particularly, in a case of the first determination, positions of the eyes can be accurately checked, and thus efficient and highly accurate checking can be performed. In a case where correctness of a facial part position is determined according to both of the first determination and the second determination, determination accuracy can be improved.

The processing section 42 determines whether a process in the tracking section 38 is to be continuously executed or a process in the model fitting section 36 is to be executed again according to a determination result in the determination section 40. For example, as exemplified in FIG. 8, in a case where a determination result is "OK" in a determination process (check process) executed in parallel to a tracking process, it is determined that the tracking section 38 performs accurate face recognition on the processing target second image. Therefore, the processing section 42 continuously performs a tracking process with the next processing target image as the second image. On the other hand, in a case where a determination result is "NG" in the determination process (check process), it is determined that a tracking deviation (for example, wrong tracking of wrongly tracking the eyes and the eyebrows) occurs with respect to the second image that is a processing target of the tracking section 38. Therefore, the processing section 42 causes the model fitting section 36 to execute a model fitting process again with the next processing target image as the first image, and to resume a tracking process using the model M generated again. In other words, a face is found again. A determination in the determination section 40 may be executed every frame. In this case, the tracking section 38 can rapidly detect a tracking deviation, and the influence of a recognition deviation can be minimized by executing a model fitting process again. In other embodiments, a determination process may be executed in a processing cycle longer than a processing cycle of a tracking process. This can contribute to a reduction of a processing load on the CPU 14a.

The action processing unit 32 executes a predetermined action such as a warning process or a traveling control process for the vehicle 1 according to a recognition result of a face of an occupant of the vehicle 1, for example, the face of the driver 302 in the occupant modeling unit 30. For example, in a case where a period in which the model M adapted in a tracking process executed by the tracking section 38 is not directed toward the front is a predetermined period or more, the action processing unit 32 determines that the driver 302 is in an inattentive state, and executes a warning process. For example, the sound control unit 14e may output a warning sound or a message via the sound output unit 9. Alternatively, a warning lamp such as an LED provided at a position recognizable by the driver 302 may emit light, or a vibrator built into the steering unit 4 or the seat 2b may be vibrated. Similarly, in a case where the model adapted in a tracking process is directed downward for a predetermined period or more or is in an eye-closed state, the action processing unit 32 determines that the driver 302 is in a drowsy state, and executes a warning process. For example, the same warning as in a case where an inattentive state is determined or a warning stronger than that may be output. The action processing unit 32 may guide the vehicle 1 to a safe location by operating automatic driving, for example, an automatic brake system or an automatic steering system based on a determination such as an inattentive state or a drowsy state.

The module configuration illustrated in FIG. 4 is an example, and division or integration of functions is possible as long as an identical process can be performed.

Figure 11:
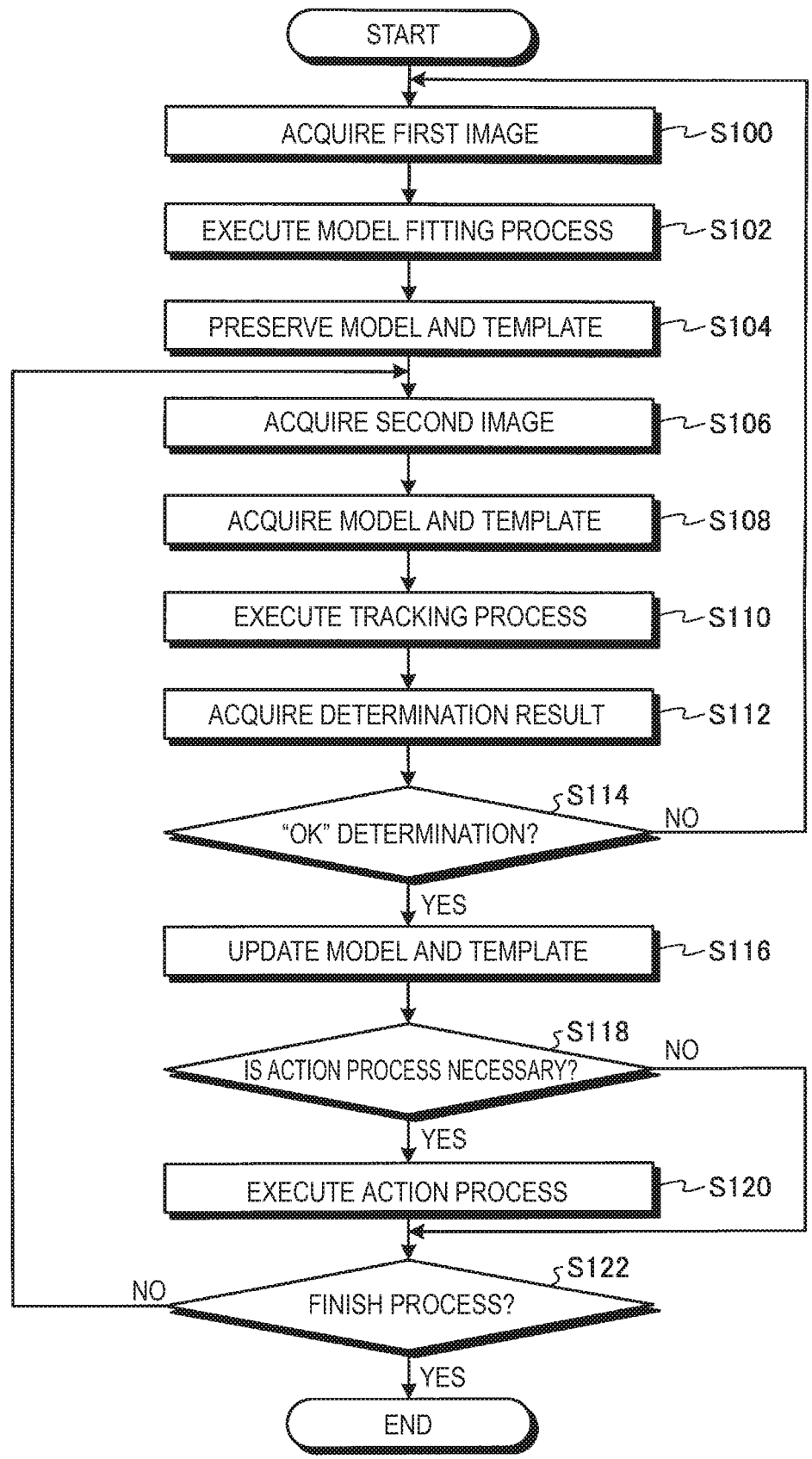
FIG. 11 is a flowchart illustrating an example of a flow of an occupant modeling process in the occupant modeling device according to the embodiment.
Figure 12:
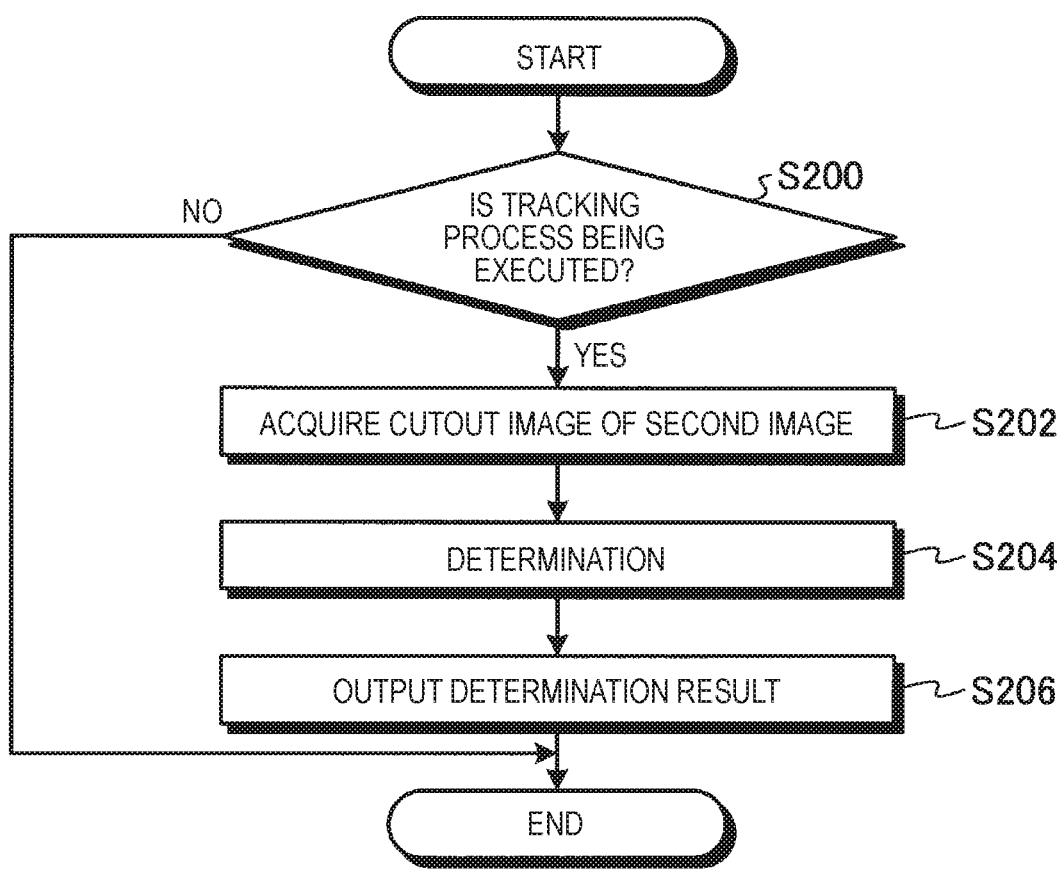
FIG. 12 is a flowchart illustrating an example of a flow of a determination process in the occupant modeling device according to the embodiment.

With reference to flowcharts of FIGS. 11 and 12, a description will be made of examples of flows of an occupant modeling process and an action process executed by the occupant modeling unit 30 and the action processing unit 32 configured in the above-described way. FIG. 11 is a flowchart for describing examples of flows of a model fitting process and a tracking process, and FIG. 12 is a flowchart for describing an example of a flow of a determination process (check process).

In a case where the vehicle 1 is powered on, the acquisition section 34 of the CPU 14a sequentially acquires captured image data (the first image for a model fitting process) obtained by the imaging unit 201 at all times regardless of traveling (S100: acquisition step). Next, the model fitting section 36 executes model fitting on the first image by using a temporary model acquired from the RAM 14c with the image acquired by the acquisition section 34 as the first image (S102: model fitting step), and generates the model M and the template T adapted to a face included in the first image, and temporarily preserves the model M and the template T into the RAM 14c (S104).

Next, the acquisition section 34 acquires a second image captured after the first image in the imaging unit 201 (S106: acquisition step), and the tracking section 38 acquires the model M and the template T used in the previous process (S108). In a case of a first tracking process, the model M and the template T generated in the model fitting process in S102 are acquired. In a case of second and subsequent tracking processes consecutively performed, the model M and the template T updated in the previous tracking process are acquired. The tracking section 38 executes a tracking process of fitting the model M with the second image (S110: tracking step).

In a case where the tracking process is being executed, as described above, the determination section 40 determines correctness of a facial part position included in the second image to which the model M is adapted by using learned information created in a machine learning method such as deep learning. For example, the determination section 40 executes a determination process (check process) as illustrated in the flowchart of FIG. 12. First, the determination section 40 checks whether or not a tracking process is currently being executed, and temporarily finishes the flow in a case where the tracking process is not being executed (No in S200). On the other hand, in a case where the tracking process is being executed (Yes in S200), the determination section 40 acquires a cutout image obtained by cutting out the periphery of positions (positions recognized by the feature points P) of the eyes recognized in the tracking process by a predetermined area (region), from the second image that is a processing target in the tracking process, that is, the second image to which the model M is adapted in the tracking process (S202). For example, correctness of a facial part included in the second image is determined by using learned image held in advance in the ROM 14b or the like (S204: determination step). In other words, a check process of checking whether or not the tracking process is correctly executed and thus the face of the driver 302 is correctly extracted is executed, and a determination result is output to the processing section 42 (S206).

Referring to the flowchart of FIG. 11, in a case where the processing section 42 acquires the determination result (S112), the processing section 42 determines whether the tracking process is to be continuously executed or the model fitting process is to be executed again (a face is found again) according to the determination result (S114: processing step). For example, in a case where the determination result is "OK" (Yes in S114), the tracking section 38 preserves the model M and the template T obtained as a result of the tracking process in the RAM 14c (S116), that is, the tracking section 38 updates and preserves the model M and the template T generated in the current tracking process to be applicable in the tracking process on the next image (second image) in the RAM 14c in a case where it is determined that the facial part position recognized in the tracking process is correctly recognized without causing a positional deviation exceeding an allowable range.

The action processing unit 32 determines whether or not an action process is necessary based on a direction or the like of the face of the model M adapted in the tracking process (S118). For example, in a case where it is determined that the driver is in an inattentive state or a drowsy state, and thus an action process is necessary (Yes in S118), the action processing unit 32 executes a predefined action process, for example, output of a warning sound or a message (S120). In a case where it is determined that an action process is not necessary in S118 (No in S118), in other words, in a case where an inattentive state or a drowsy state is not determined based on the recognized model M, a process in S120 is skipped.

In a case where it is detected by a sensor (not illustrated) that a predetermined finish condition (for example, the driver 302 is away from the seat, the driver 302 powers off the vehicle 1 or turns off a predetermined switch) is satisfied (Yes in S122), the flow is temporarily finished. On the other hand, in a case where the finish condition is not satisfied (No in S122), the flow returns to the process in S106, and the processes in S106 and the subsequent steps are repeatedly executed with the next image acquired by the acquisition section 34 as the second image. In other words, the processing section 42 permits the tracking section 38 to continuously execute the tracking process. As a result, the occupant modeling process can be continuously executed without increasing a processing load on the CPU 14a.

On the other hand, in a case where the determination result is "NG" in S114 (No in S114), the processing section 42 determines that the facial part position is not correctly recognized in the tracking process, that is, the currently applied model M is not appropriate for the tracking process, and returns to S100. Therefore, the processes in S100 and the subsequent steps are executed with the next image acquired by the acquisition section 34 as the first image. In other words, the processing section 42 causes the acquisition section 34 to execute the model fitting process again. As a result, the model M is generated again based on the first image, and thus the accuracy of a tracking process subsequent to a model fitting process can be improved or increased.

As mentioned above, according to the present embodiment, for example, in a case where the second image of a face of an occupant can be acquired, correctness of a facial part position can be determined based on learned information, and it can be determined whether a tracking process in the tracking section is to be continuously executed or a model fitting process in the model fitting section is to be executed again according to a determination result. As a result, it is possible to prevent a tracking process in which face sensing accuracy deteriorates from being continuously executed.

In the embodiment, a description has been made of an example in which an occupant modeling process is executed on the driver 302 sitting on the driver's seat, but the same process can be executed on a passenger sitting on another seat 2b of the vehicle 1, and the same effect can be achieved. An action process in the action processing unit 32 may be omitted on the passenger.

A program (occupant modeling program 14 bp) for the occupant modeling process executed by the CPU 14a of the present embodiment may be recorded on a computer readable recording medium such as a CD-ROM, a flexible disk (FD), a CD-R, or a digital versatile disk (DVD) in a file with an installable form or executable form, so as to be provided.

The occupant modeling program 14 bp may be stored on a computer connected to a network such as the Internet and may be provided in a form of being downloaded via the network. The occupant modeling program 14 bp executed in the present embodiment may be provided or distributed via a network such as the Internet.

In the occupant modeling device according to the aspect of this disclosure, for example, the determination section may specify a facial part position of the second image, for example, based on information recognized as a facial part position through the process in the tracking section, and may determine correctness with the learned information. According to this configuration, it is possible to efficiently determine whether or not a tracking process is correctly performed.

In the occupant modeling device according to the aspect of this disclosure, for example, the determination section may execute at least one of a first determination of determining correctness of a position of an eye of the face as the facial part position and a second determination of determining correctness of positions of a plurality of facial parts included in the face. According to this configuration, for example, in a case where correctness of a facial part position is determined according to either one of the first determination and the second determination, an efficient determination process can be performed. In a case where correctness of a facial part position is determined according to both of the first determination and the second determination, determination accuracy can be further improved.

The embodiment and the modification examples disclosed here have been described, but the embodiment and the modification examples are only examples, and are not intended to limit the scope of this disclosure. The novel embodiment can be implemented in various forms, and various omissions, replacements, and changes may occur within the scope without departing from the concept of this disclosure. The embodiment and modifications thereof fall within the scope or the concept of this disclosure, and also fall within the invention disclosed in the claims and the equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant modeling device comprising:
at least one processor configured to implement:
an acquisition section that acquires an image obtained by imaging a region in which there is a probability that a face of an occupant is present in a vehicle;
a model fitting section that generates a model of the face based on a first image acquired by the acquisition section;
a tracking section that adapts the model to a second image acquired after the first image acquired by the acquisition section;
a determination section that determines correctness of a facial part position included in the second image to which the model is adapted, by using learned information obtained through learning based on correct information and incorrect information regarding the facial part position of the face; and
a processing section that determines whether a process in the tracking section is to be continuously executed or a process in the model fitting section is to be executed again according to a determination result in the determination section,
wherein the determination section executes a first determination of determining correctness of a position of an eye of the face as the facial part position and a second determination of determining correctness of positions of a plurality of facial parts other than an eye included in the face.

2. The occupant modeling device according to claim 1, wherein
the determination section specifies a facial part position of the second image based on information recognized as a facial part position through the process in the tracking section, and determines correctness with the learned information.

3. An occupant modeling method comprising:
an acquisition step of acquiring an image obtained by imaging a region in which there is a probability that a face of an occupant is present in a vehicle;
a model fitting step of generating a model of the face based on a first image acquired in the acquisition step;
a tracking step of adapting the model to a second image acquired after the first image acquired in the acquisition step;
a determination step of determining correctness of a facial part position included in the second image, by using learned information obtained through learning based on correct information and incorrect information regarding the facial part position of the face; and
a processing step of determining whether a process in the tracking step is to be continuously executed or a process in the model fitting step is to be executed again according to a determination result in the determination step, wherein the determining step determines the correctness of a facial part by executing a first determination of determining correctness of a position of an eye of the face as the facial part position and a second determination of determining correctness of positions of a plurality of facial parts other than an eye included in the face.

4. An occupant modeling program stored on a non-transitory computer readable medium causing a computer to execute:

an acquisition step of acquiring an image obtained by imaging a region in which there is a probability that a face of an occupant is present in a vehicle;

a model fitting step of generating a model of the face based on a first image acquired in the acquisition step;

a tracking step of adapting the model to a second image acquired after the first image acquired in the acquisition step;

a determination step of determining correctness of a facial part position included in the second image, by using learned information obtained through learning based on correct information and incorrect information regarding the facial part position of the face; and a processing step of determining whether a process in the tracking step is to be continuously executed or a process in the model fitting step is to be executed again according to a determination result in the determination step;

wherein the determining step determines the correctness of a facial part by executing a first determination of determining correctness of a position of an eye of the face as the facial part position and a second determination of determining correctness of positions of a plurality of facial parts other than an eye included in the face.

* * * * *